(No Model.)  3 Sheets—Sheet 1.
F. P. COBHAM.
EXTENSION TABLE.
No. 471,954. Patented Mar. 29, 1892.
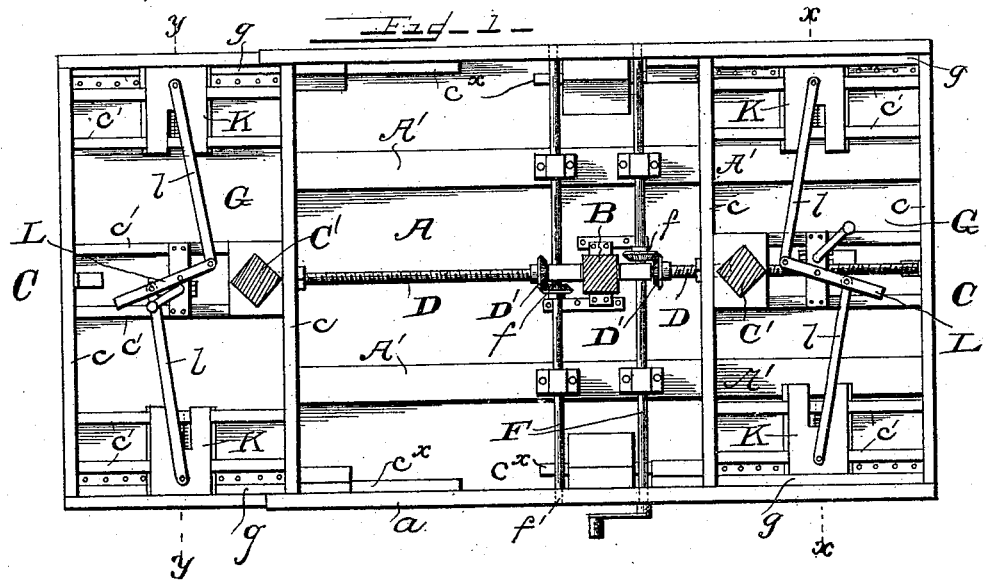
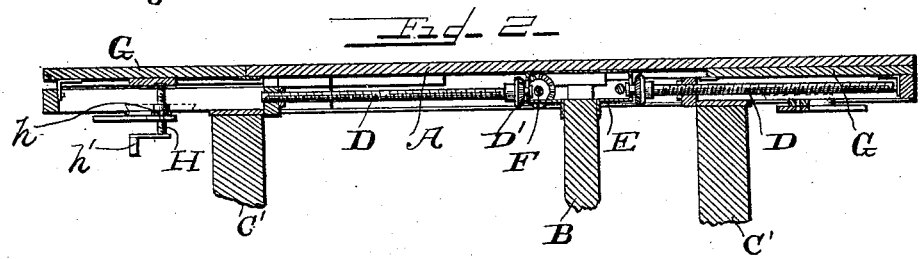
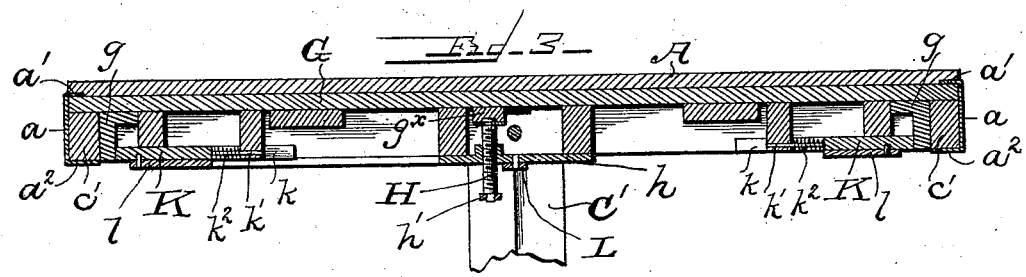
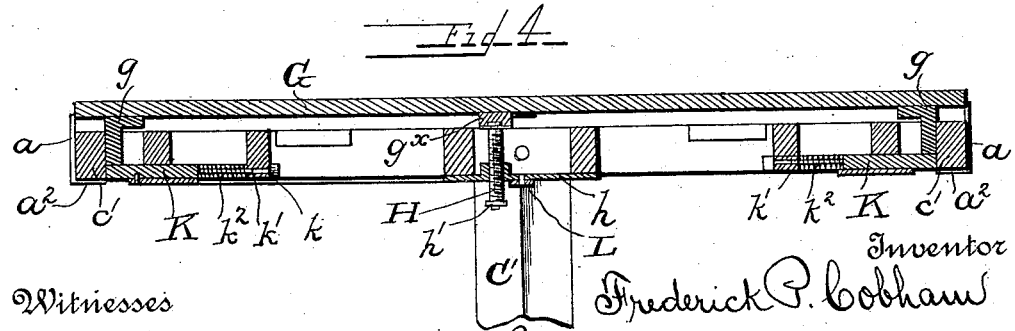
Witnesses
Inventor
Frederick P. Cobham
By Whitaker & Prevost
Attorneys (No Model.) 3 Sheets—Sheet 2.
F. P. COBHAM.
EXTENSION TABLE.
No. 471,954. Patented Mar. 29, 1892.
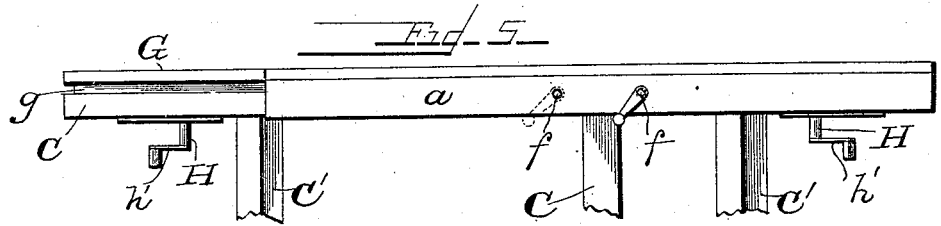
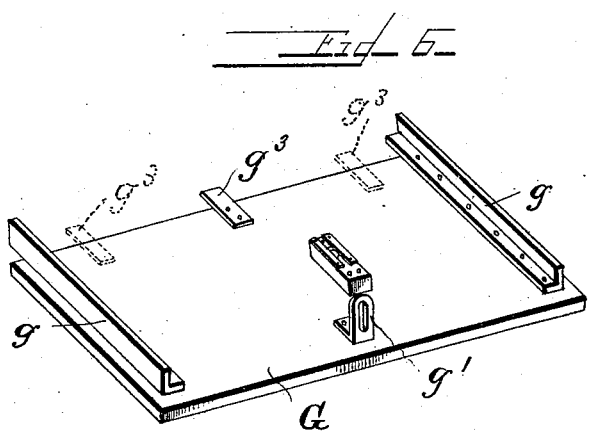
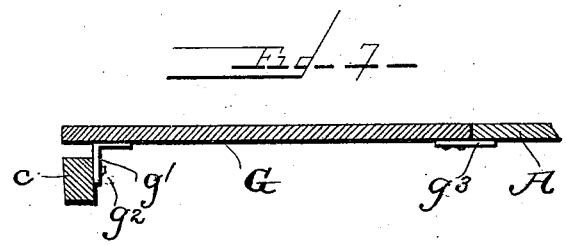
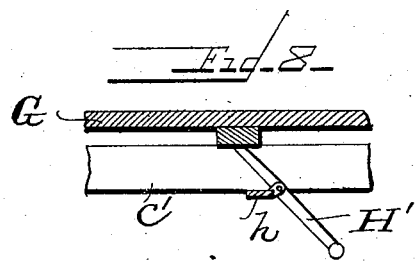
Witnesses
G. A. Tauberschmidt
J. D. Kingsbury
Inventor
Frederick P. Cobham
By Whitaker & Prevost
Attorneys (No Model.) 3 Sheets—Sheet 3.

F. P. COBHAM.
EXTENSION TABLE.

No. 471,954. Patented Mar. 29, 1892.

Witnesses
G. A. Tauberschmidt
J. D. Kingsbury

Inventor
Frederick P. Cobham
By Whitaker & Prevost
Attorneys.

UNITED STATES PATENT OFFICE.

FREDERICK P. COBHAM, OF WARREN, PENNSYLVANIA, ASSIGNOR OF ONE-HALF TO FRED MORCK AND AUGUST MORCK, JR., OF SAME PLACE.

EXTENSION-TABLE.

SPECIFICATION forming part of Letters Patent No. 471,954, dated March 29, 1892.

Application filed November 24, 1891. Serial No. 412,904. (No model.)

*To all whom it may concern:*

Be it known that I, FREDERICK P. COBHAM, a citizen of the United States, residing at Warren, in the county of Warren and State of Pennsylvania, have invented certain new and useful Improvements in Extension-Tables; and I do hereby declare the following to be a full, clear, and exact description of the invention, such as will enable others skilled in the art to which it appertains to make and use the same.

My invention is an improvement in extension-tables; and it consists in the novel features of construction and combination of parts hereinafter fully described.

In the accompanying drawings I have illustrated one form in which I have contemplated embodying my invention, and said invention is fully disclosed in the following description and claims.

Figure 9:
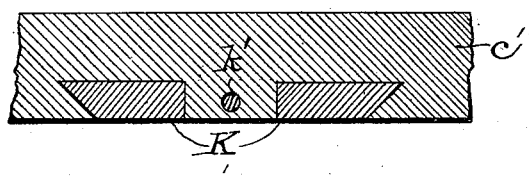
Figure 11:
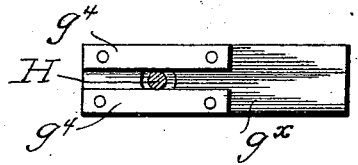
Figure 10:
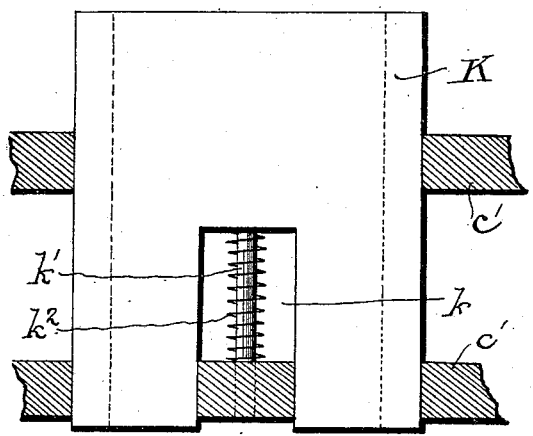
Figure 12:
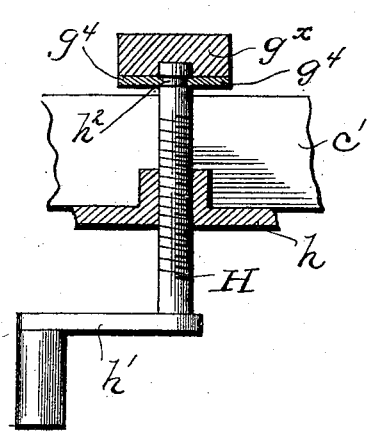
Figure 13:
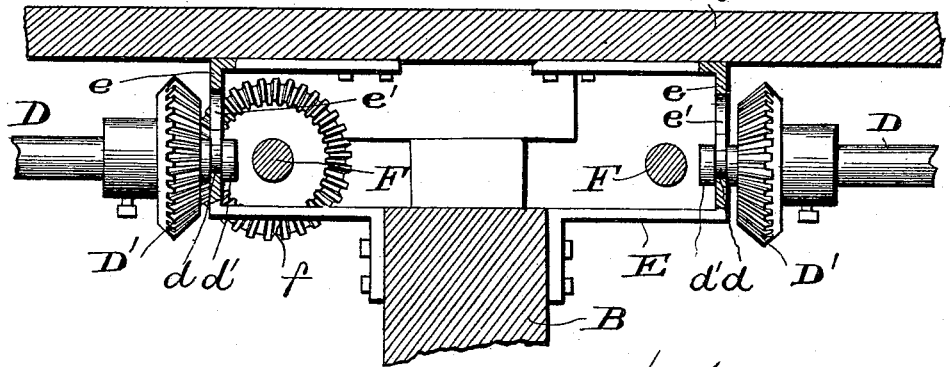
Figure 14:
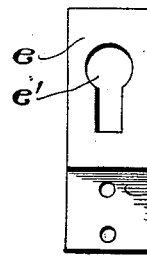

Figure 1 is a bottom view of a table constructed according to my improvements with one of the sliding end frames extended. Fig. 2 is a central longitudinal section of the same. Fig. 3 is a transverse section through one of the sliding end frames on line $x$ $x$, Fig. 1, before said frame is drawn from beneath the main table-top. Fig. 4 is a similar section on line $y$ $y$, Fig. 1, after the frame has been drawn out and the supplemental leaf elevated into the plane of the main table-top. Fig. 5 is a side elevation of the table, showing one extension-frame in its extended position. Fig. 6 is a detail view of one of the supplemental leaves. Fig. 7 is a detail sectional view showing the stops for limiting the upward movement of the leaf. Fig. 8 is a view showing a modified form of leaf-elevating device. Figs. 9 and 10 are detail views of the leaf retaining and supporting devices. Figs. 11 and 12 are details of the leaf-elevating devices shown in Figs. 1, 2, 3, and 4. Figs. 13 and 14 are details of the brackets for supporting the screw-shafts.

In the drawings I have shown a table consisting of the main table-top A and its supporting leg or legs B and provided with metallic side pieces, which are so formed as to constitute guides for sliding extension-frames C C. The metallic sides of the main table-top are formed, preferably, of galvanized iron, and consist of the vertical portion $a$, provided with two horizontally-disposed flanges $a'$ $a^2$, flange $a'$ being secured to the table-top in any desired manner and flange $a^2$ forming a guide for the sliding frames, as clearly shown in Figs. 3 and 4. The metallic sides are preferably painted and grained to imitate the wood of which the table is mainly composed. The sliding frames C consist in this instance of the transverse bars $c$ $c$ and connecting longitudinally-disposed bars $c'$ $c'$, and each frame is preferably provided with a supplemental support or leg $C'$, as shown.

The frames C are adapted to be moved outward and inward with respect to the main top A by means of longitudinally-disposed screws D, which engage nuts secured to one of the bars $c$ of each frame. In arranging this frame-actuating mechanism I prefer to employ two screws, one for operating each frame, and I preferably provide the inner end of said screw with means for detachably securing it to its support. In the drawings, Figs. 2, 13, and 14, I have shown supports for the inner ends of said screws, consisting of the angular brackets E, secured to the main table-frame, having each a vertical portion $e$, provided with a key-hole slot $e'$. The inner end of each screw D is shown as provided with a reduced portion or neck $d$ and larger head $d'$, the head being adapted to be passed through the large portion of the key-hole slot $e'$ and the screw depressed, so that the neck $d$ will engage the narrow portion of the slot, thus forming a bearing for the screws, preventing them from moving longitudinally. This result might, however, be accomplished in other ways, the object being to provide a simple construction by means of which the screw-shafts may be quickly and easily put in operative position when the parts of the table are put together and supported in such a manner as to prevent longitudinal movement, and also in taking the table apart for repairing or transportation the heads of the screws may be slipped out of their key-hole slots and the frames removed at once without unscrewing the shafts from said frames.

Each screw D is provided adjacent to bracket E with a bevel-gear $D'$, as shown, which is engaged by a bevel-gear $f$ on a transverse shaft F, extending the entire width of the table and having polygonal portions $f'$, adapted to receive a crank, handle, or wrench at its outer ends. The metallic sides are provided with suitable apertures, so that the ends of each shaft F are accessible from both sides of the table, as shown in the drawings, Figs. 1 and 5.

By employing the brackets E E the ends of the screw-shafts are supported in such manner that each of the transverse shafts F may pass within the brackets in the plane of the screw without interfering therewith, so that the shaft F may be operated from either end to rotate the screw. This construction obviates the necessity of forming the shaft F in two parts and providing each part with a gear to mesh with the gear on screw-shaft.

One or more handles or cranks are provided with each table, and by placing them in engagement with the polygonal end portions of the shafts F at either side of the table either one or both of the extension-frames may be moved out or retracted, as desired.

Each of the extension-frames carries a supplemental leaf G, which is supported on said frame in a plane below the table-top, so that it will pass under the said top when the frame is drawn inward. This leaf G is provided adjacent to either end with a downwardly-extending guiding portion consisting of a flange or rib $g$, which engages the outer longitudinal bar $c'$ of the frame, as clearly shown in Figs. 3 and 4. I also provide means for raising this leaf by hand into the plane of the table-top A and for maintaining it in such elevated position. Adjacent to the center of each of the sliding frames is a vertically-disposed screw H, mounted in a screw-threaded aperture in a plate $h$, secured to the frame, and provided with an operating crank-arm $h'$. This screw has a portion engaging the under side of the leaf G, and by turning said screw after the frame has been drawn out the leaf will be raised into the plane of the table-top. I might, however, provide other means for raising the leaf, if found desirable.

In Fig. 8 I have shown a slightly-modified form of the leaf-elevating device, which consists of a lever H', pivoted in the frame C and having a part engaging the under side of the leaf adjacent to its center. When the outer end of the lever is depressed, the leaf will be raised into the plane of the table-top.

The leaf G will be guided in its vertical movements by the flanges $g$, and also by one or more guide-plates $g'$, which are slotted plates secured, preferably, to the outer edge of the leaf and engaging pins $g^2$ in the cross-bar $c$ of the frame, and said leaf is prevented from being raised too high by the pins $g^2$ striking the ends of the slots in the guide-plates $g'$, and also by means of projections or plates $g^3$, secured to the under face of the inner edge of the leaf and adapted to engage the under face of the table-top A when the leaf has been raised exactly the required distance. Each frame is provided, also, with laterally-movable spring-actuated retaining devices, which when the leaf is raised the required distance automatically pass beneath the flanges $g\,g$ and support the leaf and retain it in its elevated position. These devices consist in this instance of the blocks K, mounted to slide in the bars $c'\,c'$ of the frame and preferably provided with beveled portions adapted to engage dovetail grooves in the said bars. The inner ends of said blocks are slotted or recessed, as shown at $k$, and provided with a guide-bolt $k'$, which engages an aperture in one of the bars $c'$. A spring $k^2$ encircles each of the guide-rods and tends to force the blocks K outward. I might apply spring-pressure to said blocks in other ways, however, as will be readily understood. The blocks when the leaf G is in its lowest position engage the flanges $g\,g$, and when the leaf is raised, so as to carry the flanges above said blocks, the springs $k^2$ will force said blocks outwardly beneath said flanges, thereby holding said leaf in its raised position in the plane of the table-top. In order to withdraw the said blocks from beneath the flanges $g\,g$ to permit the leaf to be lowered, I provide in this instance a pivoted hand-lever L, pivoted, preferably, to the plate $h$, as shown, and connected at points on opposite sides of its point of pivoting by means of rods $l\,l$ with the said blocks. It will thus be seen that the lever L may be moved to withdraw the blocks from beneath the flanges $g\,g$ and permit the leaf to fall of its own weight, the screw H having been lowered, or I may lower the leaf gradually by turning the screw H. In the latter case I prefer to secure the leaf-engaging end of the screw H to the leaf in such a manner as not to interfere with its rotation, but to insure the proper movements of the leaf. In Figs. 11 and 12 I have shown one construction for accomplishing this result. The leaf G, or, better, a strip $g^\times$, secured to the under side of the leaf, is provided with a recess to receive the head of the screw H, the said screw being also provided near its end with an annular groove $h^2$, and the strip $g^\times$ is provided with detachable plates $g^4$, which are secured to the strip $g^\times$, preferably by means of screws, and which engage the annular groove $h^2$, thus securing the screw H with respect to the leaf, but permitting it to rotate freely. I may, however, dispense with this construction and let the end of screw H simply engage or impinge against the leaf or a strip or block secured thereto.

The operation of my improved extension-table is as follows: When it is desired to extend one or both ends of the table, the wrench or handle is applied to either end of the shaft F, which controls the sliding frame desired to be extended, and the said shaft is rotated, thereby rotating the screw-shaft and forcing out the extension-frame as far as necessary. The screw H is then turned or the lever H' depressed, and the leaf G is raised into the plane of the table-top, when it will be stopped by the projection or projections $g^3$ striking the under side of the main table-top and by the pins $g^2$ striking the ends of the slots in the plates $g'$. At the same moment the automatic spring-actuated retaining and supporting blocks will be forced beneath flanges $g$ $g$ and the leaf will be rigidly supported exactly in the plane of the table-top and maintained in that position. The other frame may be extended in the same manner. When it is desired to retract one of the frames, the hand-lever L is moved to withdraw the retaining-blocks from beneath the flanges $g$ $g$ of the leaf, and the leaf may be lowered to its normal position upon the frame C either by gravity, if the screw H has previously been screwed down, or, if connected to the leaf, as shown in Figs. 11 and 12, the leaf can be positively lowered. The sliding frames C are guided in their movements by the guides $A'$ $A'$, which are secured to the main table-top and engage suitable recesses in the bars of said frames. In order to prevent the said frames from tilting on their supports when in their outermost positions, I provide arms $c^x$, which extend inward from the frames and engage the under side of the table-top, as shown in Figs. 1 and 2.

I do not desire to be limited to the exact construction herein shown and described, as slight variations may be made in the same without departing from the spirit of my invention.

What I claim, and desire to secure by Letters Patent, is—

1. In an extension-table, the combination, with the main table-top and supports for the same, of the sliding extension-frames carrying supplemental leaves located in a plane beneath the table-top, means for moving said frames to remove said leaves from beneath the main table-top, elevating devices for raising said leaves into the plane of the table-top after they have reached their outermost position, and automatic retaining devices for engaging parts connected with said leaves for retaining them and supporting them in their elevated position independently of the elevating devices, substantially as described.

2. In an extension-table, the combination, with the main table-top and supports for the same, of the sliding extension-frames carrying supplemental leaves adapted to be moved beneath said main table-top and provided with downwardly-extending guiding portions, means for moving said frames to carry said leaves out from beneath the table-top, elevating devices for raising the leaves into the plane of the table-top, and spring-actuated retaining devices adapted to be forced beneath said guiding portions when the leaves are raised to support and retain said leaves in their elevated positions, substantially as described.

3. In an extension-table, the combination, with the main table-top and supports for the same, of the extension-frames carrying supplemental leaves adapted to lie beneath said table-top and provided with the guiding-flanges, the elevating devices for said leaves, the spring-actuated sliding blocks adapted to pass beneath the said flanges when the leaves are raised to support and retain them in their elevated positions, the stops for limiting the upward movement of the leaves, and means for retracting the said spring-actuated blocks, substantially as described.

4. In an extension-table, the combination, with the table-top and its supports, of the sliding extension-frames, separate screw-shafts for operating said frames, and a transverse actuating-shaft for each of said screw-shafts connected thereto, extending across the table, and adapted to be operated from either side of the same, whereby each of said screw-shafts and the extension-frame connected therewith may be independently operated from either side of the table, substantially as described.

5. In an extension-table, the combination, with the main table-top and its supports, of the sliding extension-frames, separate screw-shafts for each of said frames having their inner ends provided with reduced portions adapted to removably engage slotted supports, and an actuating-shaft for each screw-shaft connected thereto, extending across the table, and adapted to be operated from either side of the table, whereby each frame and its connected screw-shaft can be operated independently from either side of the table, substantially as described.

6. In an extension-table, the combination, with the main table-top and its supports, of the extension-frames carrying supplemental leaves adapted to pass beneath said table-top, means for moving said frames to disengage said leaves from said table-top, the screws for elevating and lowering said leaves into and out of the plane of the table-top, and the spring-actuated blocks for retaining and supporting said leaves in elevated positions, substantially as described.

In testimony whereof I affix my signature in presence of two witnesses.

FREDERICK P. COBHAM.

Witnesses:
  A. C. KIRBERGER,
  GEO. REIG, Jr.